United States Patent [19]
Krütten

[11] Patent Number: 5,609,582
[45] Date of Patent: Mar. 11, 1997

[54] DRINKING AID DEVICE FOR ELDERLY PEOPLE, PATIENTS AND THE LIKE

[76] Inventor: Victor Krütten, Richard-Klinger-Strasse 27, W-6270 Idstein, Germany

[21] Appl. No.: 422,255

[22] Filed: Apr. 14, 1995

[51] Int. Cl.⁶ ..................................................... A61M 5/00
[52] U.S. Cl. ................... 604/247; 128/202.15; 137/859; 137/512.15
[58] Field of Search ................................. 604/8–10, 247; 128/202.15, 202.16; 137/859, 512

[56] References Cited

U.S. PATENT DOCUMENTS

| | | |
|---|---|---|
| 3,084,707 | 4/1963 | Frye . |
| 3,718,152 | 2/1973 | Kraakman . |
| 4,129,143 | 12/1978 | Hoffman . |
| 4,398,533 | 8/1983 | Barker . |
| 4,776,839 | 10/1988 | Doumenis . |
| 4,922,955 | 5/1990 | Uri . |
| 4,971,048 | 11/1990 | Seekins . |

FOREIGN PATENT DOCUMENTS 513769  10/1939  United Kingdom .

*Primary Examiner*—Randall L. Green
*Assistant Examiner*—Perry E. Van Over
*Attorney, Agent, or Firm*—Thomas I. Rozsa; Tony D. Chen

[57] ABSTRACT

A drinking aid device which is used for fluid intake, in particular for elderly people, patients and the like. The user receives the liquid from a valve assembly with the assistance of a mouthpiece member. The valve assembly includes an upper lid member, a lower housing member and a closure member which is disposed between the lid member and the housing member. The closure member has one or more apertures and is movable by suction between an open position and a closed position in a check valve fashion for allowing the liquid to flow therethrough.

15 Claims, 2 Drawing Sheets

DRINKING AID DEVICE FOR ELDERLY PEOPLE, PATIENTS AND THE LIKE

BACKGROUND OF THE INVENTION

1. Field of the Invention

The present invention relates to the field of medical devices. More particularly, the present invention relates to the field of drinking devices for assisting elderly people, patients and the like in drinking liquid by themselves.

2. Description of the Prior Art

Generally, it is well known that elderly people in nursing homes or retirement homes do not consume enough liquid from a medical standpoint. A problem that many elderly people encounter from drinking liquid out of a cup is that they require hand-eye coordination which is difficult for elderly people with arthritis or other problems with their hands. Similarly, patients in intensive and critical care units of hospitals, e.g., burn and accident victims, also do not consume enough liquid because after surgery, they cannot move their arms and hands to grasp a drinking cup.

In the prior art, there was a suggestion pertaining to a drinking device with a drip chamber, in which a swimming member closes the passageway entrance to the drip chamber when a given liquid level is reached, so that the person can drink the liquid in the lower part of the drip chamber. The swimming member sinks downward and provides a free entrance to the refilling afflux of the drip chamber. However, the commercial production of such a drinking device has not proven to be cost effective due to high manufacturing costs.

It is therefore highly desirable to have a very efficient and also very effective design and construction of a drinking aid device which will allow elderly people, patients and the like to drink liquid on their own at any given time without the aid of nursing staff or other individuals. It is also desirable to have a valve assembly which is capable of allowing liquid flow therethrough when desired by an individual using the drinking aid device.

SUMMARY OF THE INVENTION

The present invention is a novel and unique independent drinking aid device for elderly people, patients and the like to drink liquid on their own at any given time without the aid of nursing staff or other individuals. The drinking aid device includes a valve assembly and a drinking means. The valve assembly has an upper lid member, a flexible closure member and a lower housing member. The flexible closure member is disposed and air tightly sealed between the lid member and the housing member and it is also liquid tightly sealed. The drinking means includes a mouthpiece member or a nipple member which is attached to a support frame member. When suction pressure is generated by an individual at the nipple member, the closure member is moved to an open position, where a small quantity of liquid is given free access through the valve assembly which allows the patient to drink the liquid from the nipple member. When the suction pressure is ceased, the closure member moves back into a closed position to prevent liquid from flowing through the valve assembly. The closing power of the closure member is able to work against the power of the static height of a liquid reservoir and the position or the height of the drinking means.

The drinking aid device can be used with patients who are handicapped or who are unable to sit up straight to drink because of a previous accident or orthopedic operations. The drinking aid device can also be used with small children or patients who suffer migraines and cannot move their head to drink. In another application, the drinking aid device can be used in the field of sports, e.g., bicycle competition or automobile racing.

It has been discovered, according to the present invention, that by providing a drinking aid device with a drinking means which includes a mouthpiece member attached to a support frame member, it will provide means for elderly people, patients and the like to drink liquid from a given reservoir on their own at any given time without the aid of nursing staff or other individuals.

It has additionally been discovered, according to the present invention, that by providing a drinking aid device with a valve assembly which includes a flexible closure member disposed and air-tightly and liquid-tightly sealed between an upper lid member and a lower housing member, it will provide means for controlling liquid flow through the valve assembly.

It has further been discovered, according to the present invention, that by utilizing an operating member which is attached to the upper lid member of the valve assembly, it will provide means to assist the closure member into an open position for allowing a remote liquid reservoir to be refilled or emptied.

It is therefore an object of the present invention to provide a drinking aid device which can be used with a remote liquid reservoir to supply liquid for elderly people, patients and the like to drink liquid from a given reservoir on their own at any given time without the aid of nursing staff or other individuals.

It is also an object of the present invention to provide a drinking aid device which is easily and efficiently manufactured, and conforms to conventional forms of manufacture.

It is an additional object of the present invention to provide a drinking aid device with a drinking means which includes a mouthpiece member attached to a support frame member, so that elderly people, patients and the like can suck on the mouthpiece member to drink the liquid on their own at any given time without the aid of nursing staff or other individuals.

It is a further object of the present invention to provide a drinking aid device with a valve assembly which includes a flexible closure member disposed in a lower housing member and air-tightly and liquid-tightly sealed between an upper lid member and the lower housing member, so that the closure member can control liquid flow through the valve assembly.

It is an additional object of the present invention to provide a drinking aid device which can be used with an operating member, so that the closure member can be moved into an open position for allowing a remote liquid reservoir to be refilled or emptied.

In the preferred embodiment of the present invention, the drinking aid device has a valve assembly which includes an upper lid member, a lower housing member and a flexible closure member which is made of an elastic synthetic membrane material. The closure member is disposed between the lid member and the housing member and can be moved from a closed position to an open position. The feature of the elastic membrane of the closure member makes for simple construction, durable function and is easy to sterilize. The cleaning and rinsing of the valve assembly is made possible in the direction of the liquid flow and without any problems.

The closure member is fixed within the housing member of the valve assembly and remains under prestressing in the closed position on the protuberating valve seat. The valve seat forms a seal and stretches towards the closure member. The axial stretching makes it easy to control the parameters available for the accommodation of the needed suction pressure for drinking or shifting of the closure member in an opened position or the needed sealing power of the closure member against the particular working liquid-level of the whole system.

The flow connection between the lid member and the housing member is controlled by openings on the closure member. Therefore, no complicated canals in the valve assembly are required to direct the flow connection. The dimensions of the openings on the closure member can be varied. Through the openings on the closure member, the flexibility of the closure member can be improved.

The present invention can be used with a drip chamber and a tube clamp. The drip chamber is located upstream from the valve assembly and is closable from the side of the lid member. Through this assembly, the drinking aid device can be integrally connected to a transition assembly with easy filling of the drinking aid device. The drip chamber is filled by pumping when the tube clamp is opened or not clamped onto the tube. When the liquid reservoir is filled, the clamp is closed, so that by pressing on the drip chamber, the liquid can be pressed up to the mouthpiece member. There is also provided a coupling member at the lid member of the valve assembly, so that the drinking aid device can be easily connected with another transition device or devices which have remote liquid reservoirs. The coupling member corresponds to the conventional connection in the art, e.g., luer or luerlocking connection or any other suitable type of connection means.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a drinking aid device which incorporates a one-way valve that opens only when suction is generated by a user. The valve closes immediately after suction has ceased.

Figure 1:
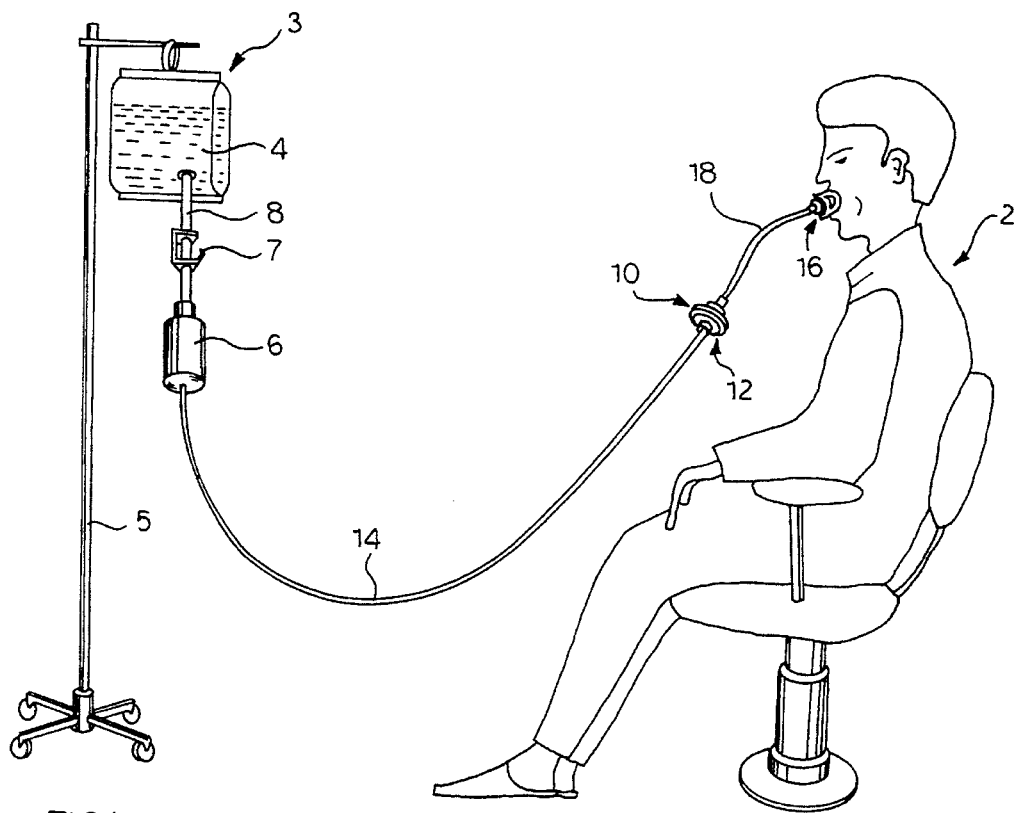
FIG. 1 is a perspective view of the present invention drinking aid device, showing a remote liquid reservoir and a person using the drink aid device.

Referring to FIG. 1, there is illustrated a patient 2 who is utilizing the present invention drinking aid device 10. The drinking aid device 10 can be used for independently drinking liquid, e.g., water, tea or other suitable fluids. The drinking aid device 10 can be used in conjunction with a cup, bottle, or in combination with a conventional remote Luer-Locking attachable liquid reservoir 3 which has liquid 4 therein.

The drinking aid device 10 includes a valve assembly 12 which is connected to the remote liquid reservoir 3 by a first elongated flexible tube or connection means 14 (FIG. 1 shows that the connection means 14 is connected between the valve assembly 12 and a drip chamber 6). A drinking means 16 is connected to the valve assembly 12 by a second elongated flexible tube or connection means 18. The liquid reservoir 3 may be suspended on a movable pole support 5 with wheels. It will be appreciated that the movable pole support 5 is merely one illustrative embodiment for suspending the liquid reservoir 3 and the present invention can include many other conventional means to suspend the liquid reservoir 3 known to one skilled in the art.

The drinking aid device 10 can also be used in combination with a drip chamber 6 which is provided upstream and a tube clamp 7. The drip chamber 6 is connected to the valve assembly 12 by the first connection means 14. The other end of the drip chamber 6 is connected to the liquid reservoir 3 by a third elongated flexible tube or connection means 8. The tube clamp 7 is clamped onto the connection means 8 which leads to the liquid reservoir 3, with the clamp 7 being located upstream of the drip chamber 6. With the assistance of the drip chamber 6 and the tube clamp 7, the drinking aid device 10 can easily be emptied or refilled with liquid. When the tube clamp 7 is in an open position, the drip chamber 6 can be filled by pumping, and when the tube clamp 7 is in a closed position, the liquid can be pressed towards the drinking means 16 by pressing on the drip chamber 6. This will have a graduated liquid reservoir 3 which allows easy control of the amount of liquid that the patient can drink.

Figure 2:
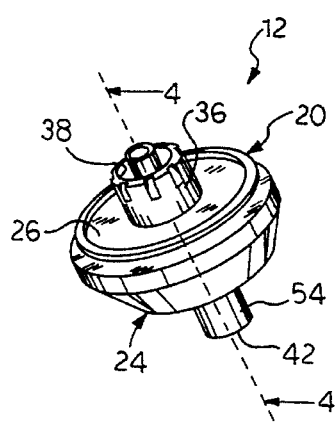
FIG. 2 is a perspective view of a valve assembly of the present invention drinking aid device.
Figure 3:
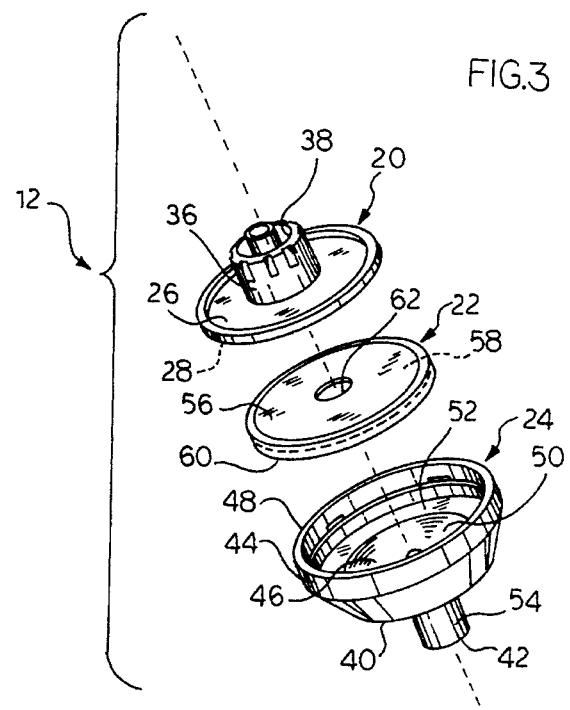
FIG. 3 is an exploded perspective view of the valve assembly shown in FIG. 2.
Figure 4:
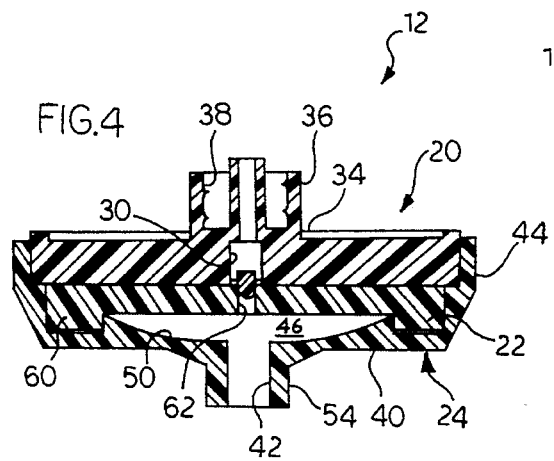
FIG. 4 is an enlarged cross-sectional view taken along line 4—4 of FIG. 2.
Figure 5:
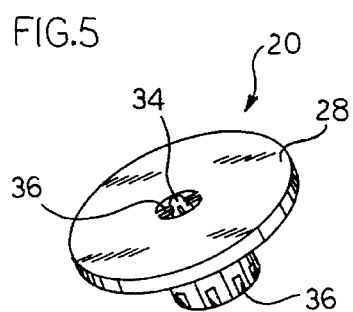
FIG. 5 is a lower perspective view of the upper lid member of the valve assembly.

FIG. 2 shows a perspective view the valve assembly 12. FIG. 3 shows an exploded view of the valve assembly 12. FIG. 4 shows a crosssectional of the valve assembly. FIG. 5 shows a bottom perspective view of an upper lid member 20 of the valve assembly. Referring to FIGS. 2, 3, 4 and 5, the valve assembly 12 is generally an inversely conical shaped structure, but it may be in any other shape if desirable. The valve assembly 12 includes the upper lid member 20, a flexible closure member 22 for preventing liquid flow through the valve assembly 12 in one direction, and a lower housing member 24. The upper lid member 20 has a top side 26, a bottom side 28 and a central opening 30 which extends through from the top side 26 to the bottom side 28.

Referring to FIGS. 2, 3 and 4, a coupling member 36 is integrally connected to the center of the top side 26 of the upper lid member 20 and communicates with the central opening 30. The coupling member 36 has a corresponding "luer-lock-positive-tip" at one end 38 which is conventional in the art. It allows for a quick connection to existing transition devices as shown in FIG. 1. The coupling member 36 is conventional in the art and makes the connection to existing transition devices easy.

It will be appreciated that the coupling member 36 can be integrally manufactured with the upper lid member 20 or the coupling member 36 may be an additional component in the present invention drinking aid device 10, in which the coupling member 36 can be directly connected to an inlet port attachment (not shown) on the upper lid member 20.

Referring to FIGS. 4 and 5, there is shown a protuberating valve seat 34 which is integrally connected to the bottom side 28 of the lid member 20 and located within the central opening 30. This allows liquid to flow through the lid member 20.

Referring to FIGS. 3 and 4, the lower housing member 24 has a bottom 40 with a narrow central opening 42 and a circumferential sidewall 44. The sidewall 44 is integrally formed with and extends upwardly from the bottom 40 to an upper rim 48 and forms an interior chamber 46. The interior chamber 46 has a concave cavity 50 and an annular groove 52 which is formed as a channel around the periphery and surrounds the concave cavity 50. There is provided an outlet port attachment 54 which forms a tube seat means for connecting one end of the second connection means 18 while the other end is connected to the drinking means 16 as shown in FIG. 1. The outlet port attachment 54 is integrally connected to the bottom 40 of the lower housing member 24 such that it protrudes and communicates with the concave cavity 50 through the central opening 42 of the housing member 24.

Figure 6:
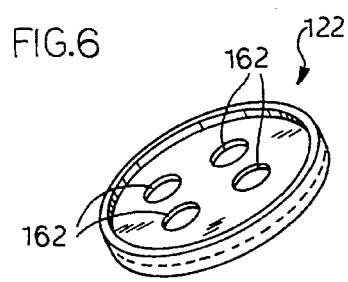
FIG. 6 is a perspective view of an alternative embodiment of the closure member.

The closure member 22 has a top surface 56, a bottom surface 58, an annular ring shaped flange 60 which extends down from the bottom surface 58 and located on the periphery of the closure member 22, and at least one aperture 62. The aperture 62 extends through from the top surface 56 to the bottom surface 58 and allows liquid to flow between the upper lid member 20 and the lower housing member 24. Although, there is shown only one aperture 62 on the closure member 22, it will be appreciated that the closure member 22 functions just as well with a multiplicity of apertures 162, as shown in FIG. 6. In the alternative embodiment of the closure member 122, the multiplicity of apertures 162 extend in a radial direction and are equally spaced apart from each other.

The closure member 22 is disposed and captively held within the concave cavity 50 of the lower housing member 24 such that the annular ring shaped flange 60 is tightly engaged with and secured within the annular groove 52 of the lower housing member 24. This type of engagement makes it impossible for any assembling errors to occur and the closure member 22 automatically adjusts itself against the protuberating valve seat 34 of the upper lid member 20. The closure member 22 is movable by suction between an open position and a closed position in a check valve fashion for allowing the liquid to flow therethrough.

The upper lid member 20 is air-tightly and liquid-tightly attached to the upper rim 48 of the lower housing member 24 by ultrasound-welding, epoxy, clamping, or any conventional means know to one skilled in the art, to provide a sealing engagement between the upper lid member 20 and the lower housing member 24. The closure member 22 is clamped between the upper lid member 20 and the lower housing member 24, and at the same time provides a sealing of the two members 20 and 24 against each other.

Referring again to FIGS. 4 and 5, the protuberating valve seat 34 of the upper lid member 20 abuts against the top surface 56 of the closure member 22 to provide the closed position which interrupts the flow of the liquid. The protuberating valve seat 34 causes a prestressing on the closure member 22 when the upper lid member 20 and the lower housing member 24 are joined together. This prestressing produces a closing power of the closure member 22 in the direction of the protuberating valve seat 34.

Figure 7:
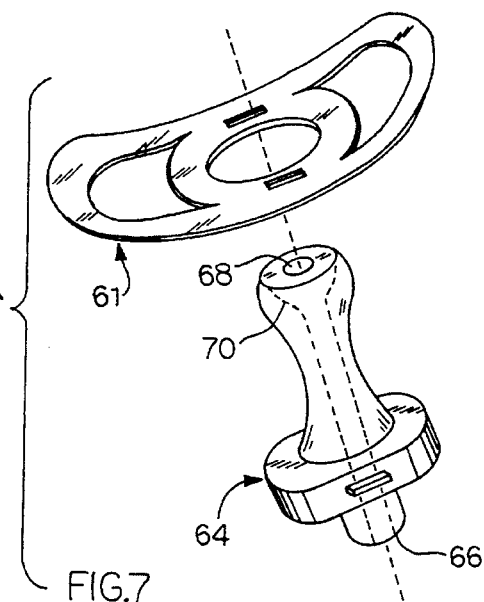
FIG. 7 is a perspective view of a nipple member which is attached to a support frame member of the drinking aid device.

Referring to FIG. 7, there is shown the drinking means 16 of the present invention drinking aid device 10. The drinking means 16 is similar to a pacifier that a baby uses and includes a nipple member or mouthpiece member 64 which is attached to a support frame member 61. The contour of the mouthpiece member 64 should offer an optimal adaption to the mouth or the palate of the patient and should be large enough to prevent the patient from swallowing the mouthpiece member 64. The mouthpiece member 64 has an inlet opening 66 and an outlet opening 68. The outlet opening 68 has the form of an inner cone 70 (shown in dashed lines), which is equivalent to the "luer-cone" used in the art, so that a luer-syringe can be connected thereon and the valve assembly 12 can be emptied after the connection with the liquid reservoir. The drink aid device can be drained by this procedure. The liquid can be drawn up to the mouthpiece member 64 and immediately drunk by the patient.

Referring to FIGS. 3, 4 and 7, the closure member 22 can be opened when the user sucks the mouthpiece member 64. The liquid supply is interrupted when the suction ceases and the closure member 22 is moved back on the protuberating valve seat 34 of the lid member 20 on account of its prestressing. The rest of the liquid will be kept within the mouthpiece member 64, so that with the next usage, the liquid can be absorbed by the patient.

To make sure that the patient does not swallow in the wrong manner, the liquid cannot be absorbed without sucking on the mouthpiece member 64. This needs to be considered, when the closure member 22 is chosen. The prestress of the closure member 22 needs to correspond with the static liquid pressure, so that in case the mouthpiece member 64 falls off, leakage of the liquid reservoir is prevented. The static liquid pressure is composed of the static height of the liquid reservoir and the particular position of the mouthpiece member 64. The particular suction pressure needed for drinking on one hand and the necessary sealing effect against the particular working column of liquid on the other hand is reached by a corresponding length of the protuberating valve seat 34.

Referring to FIGS. 1 through 7, the operation of the foregoing embodiment will now be described. When suction is applied to the outlet opening 68 of the mouthpiece member 64, the top surface 56 of the closure member 22 is moved to the open position away from the protuberating valve seat 34 of the lid member 20, thereby allowing the liquid to flow through the at least one aperture 62 of the closure member 22 for allowing the patient to drink the liquid. When suction is ceased, the top surface 56 of the closure member 22 is moved back to the closed position and the liquid stops flowing through the aperture 62 of the closure member 22. The required suction pressure is lowest when the drinking device rests approximately twenty-four (24) inches above the patient's mouth.

The drinking aid device 10 can be used for a period of up to three days if the device is properly cleaned at least once a day. To clean the device, attach a water filled luer-locking syringe to the outlet opening of the mouthpiece member 64 and flush the device with water by depressing the water out of the syringe through the drinking aid device 10. The device can also be cleaned by soaking it in warm water and dish-washing detergent.

The present invention conforms to conventional forms of manufacture, is of simple construction and is easy to use. The valve assembly 12 can be made from several materials. The manufacturing process which could accommodate the construction of the valve assembly 12 may be injection, thermoform, etc. or other molding process. By way of example only, the upper lid member 20 and the lower housing member 24 can be made of plastic material. By way of example, the closure member 22 can be made of synthetic material.

Figure 8:
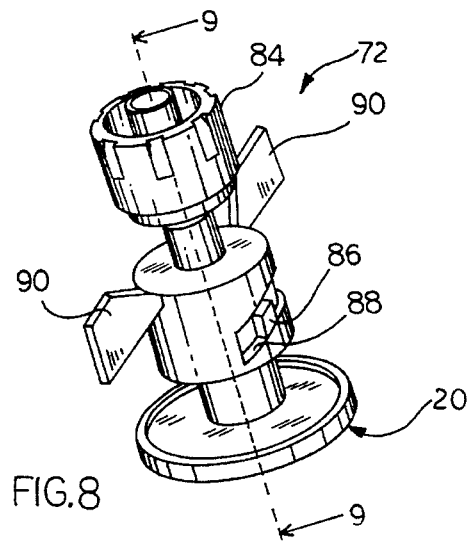
FIG. 8 is a perspective view of an operating member which is directly attached to the upper lid member of the drinking aid device.
Figure 9:
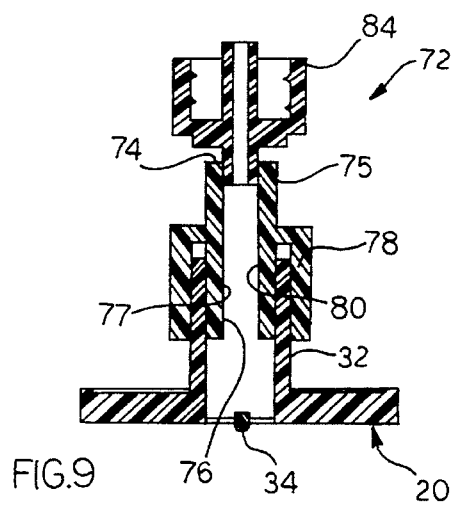
FIG. 9 is an enlarged cross-sectional view taken along line 9—9 of FIG. 8.

Referring to FIGS. 8 and 9, there is shown at 72 an operating piece member which can be utilized for emptying the valve assembly 12 shown in FIGS. 2, 3 and 4. The operating member 72 comprises a hollow cylindrical tube or channel 80 which has an upper portion 75 with a top end opening 74 and a lower portion 77 with a bottom end opening 76. The top end opening 74 communicates with the bottom end opening 76. An outer cover 78 is integrally attached to the hollow cylindrical tube 80 such that the outer cover 78 is spaced apart and covers the lower portion 77. In this configuration, the upper lid member 20 does not have an integrated coupling member 36. The bottom end opening 76 of the hollow cylindrical tube 80 is geared into an inlet port attachment 32 on the upper lid member 20 and is movable in an axial direction. A coupling member 84 which is exactly the same as the coupling member 36 is attached to the top end opening 74 of the hollow cylindrical tube 80. It may be possible to join the coupling member 84 with a counter-coupling member by a pipe to a liquid reservoir. The outer cover 78 of the operating member 72 has two opposite curved channels or grooves 88 (only one is shown in FIG. 8) which extend from the lower end to the upper end of the outer cover 78, which are geared to specific cams 86 (only one is shown in FIG. 8). Two opposite wing tips turning-handles 90 are integrally attached to the outer cover 78 for assisting in rotating the operating piece member 72.

With the assistance of the operating piece member 72, the closure member can be lifted away from the protuberating valve seat 34 and into the open position, so that the drinking aid device can be filled with liquid from the mouthpiece member. The way the operating piece member 72 functions is that the cams 86 travel along the two opposite curved channels 88. By turning the operating piece member 72 with the wing tips turning-handles 90, the outer cover 78 is moved towards the direction of the upper lid member 20. The hollow cylindrical tube 80 of the operating member 72 is moved in an axial direction at the same time, and thereby the closure member is lifted from its closed position and the valve assembly can be emptied. The operating piece member 72 can be positioned back to the closed position by turning it in the opposite direction, so that the closure member is once again abutting against the protuberating valve seat 34. When the user sucks on the mouthpiece member, the closure member is lifted from its closed position, so that the user receives liquid immediately without having to exhaust the air volume that is inside the first and second connection means.

Defined in detail, the present invention is a drinking aid device for elderly people, patients or the like used in conjunction with a remote liquid reservoir which has liquid therein, the drinking aid device comprising: (a) a valve assembly including a lower housing member, a flexible closure member for blocking said liquid from flowing through the valve assembly in one direction, and an upper lid member; (b) said lower housing member having a bottom with a central opening and a sidewall integrally formed with and upwardly extending from the bottom to an upper rim and forming an interior chamber which has a concave cavity and an annular groove located on the periphery of and surrounding the concave cavity; (c) an outlet port attachment integrally attached to said bottom of said lower housing member, and protruding and communicating with said concave cavity of said interior chamber through said central opening of said lower housing member; (d) said flexible closure member having a bottom surface, a top surface, an annular ring shaped flange extending down from the bottom surface and located on the periphery of said closure member, and a multiplicity of apertures extending through from the top surface to the bottom surface; (e) said flexible closure member disposed within said interior chamber of said lower housing member such that said annular ring shaped flange of said closure member is tightly engaged with and secured within said annular groove of said lower housing member and movable by suction between an open position and a closed position for allowing said liquid to flow therethrough; (f) said upper lid member having a bottom side, a top side, and a central opening which extends through from the top side to the bottom side, the bottom side having a protuberating valve seat mounted within the central opening; (g) a coupling member integrally attached to said top side of said upper lid member and communicating with said central opening; (h) means for air-tightly attaching said upper lid member to said upper rim of said lower housing member such that said protuberating valve seat is brought into contact with said top surface of said closure member in said closed position; (i) a drinking means having an outlet opening and an inlet opening for allowing the patient to suck and drink said liquid; (j) first connection means having one end attached to said coupling member and the other end attached to said liquid reservoir for allowing said liquid to flow therethrough; and (k) second connection means having one end attached to said outlet port attachment of said lower housing member and the other end attached to said inlet opening of said drinking means for allowing said liquid to flow therethrough; (l) whereby when suction is applied to said outlet opening of said drinking means, said top surface of said closure member is moved to said open position away from said protuberating valve seat of said upper lid member, thereby allowing said liquid to flow through said multiplicity of apertures of said closure member for allowing the person to drink said liquid, and when suction is ceased, said top surface of said closure member is moved back to said closed position and said liquid stops flowing through said multiplicity of apertures of said closure member.

Defined broadly, the present invention is a drinking device for elderly people, patients or the like used in conjunction with a remote liquid reservoir which has liquid therein, the drinking device comprising: (a) a housing member having a bottom with an opening and a sidewall integrally formed with and upwardly extending from the bottom to an upper rim and forming an interior chamber, the interior chamber having a cavity and a groove located on the periphery of and surrounding the cavity; (b) an outlet port attachment attached to said bottom of said housing member, and protruding and communicating with said cavity of said interior chamber through said opening of said housing member; (c) a closure member having a bottom surface, a top surface, a flange extending down from the bottom surface and located on the periphery of the closure member, and at least one aperture extending through from the top surface to the bottom surface, the closure member disposed within said interior chamber of said housing member such that the flange is tightly engaged with and secured within said groove of said housing member and movable by suction between an open position and a closed position for allowing said liquid to flow therethrough; (d) a lid member air-tightly attached to said upper rim of said housing member and having a bottom side, a top side, and an opening extending through from the top side to the bottom side, and a coupling member integrally attached to the top side and communicating with the opening, the bottom side having a protuberating valve seat located within the opening, where the protuberating valve seat is brought into contact with said top surface of said closure member in said closed position; (e) drinking means for allowing the patient to suck and drink said liquid; and (f) means for connecting said coupling member of said lid member to said liquid reservoir and said outlet port attachment of said housing to said drinking means; (h) whereby when suction is applied to said drinking means, said top surface of said closure member is moved to said open position away from said protuberating valve seat of said lid member, thereby allowing said liquid to flow through said at least one aperture on said closure member for allowing the person to drink said liquid, and when suction is ceased, said top surface of said closure member is moved back to said closed position and said liquid stops flowing through said at least one aperture on said closure member.

Defined more broadly, the present invention is a drinking device for elderly people, patients or the like used in conjunction with a remote liquid reservoir which has liquid therein, the drinking device comprising: (a) a housing member having a chamber, an opening and an outlet port attached to the housing member and communicating with the chamber through the opening; (b) a closure member disposed and secured within said chamber of said housing member and movable by suction between an open position and a closed position for allowing said liquid to flow therethrough and having at least one aperture; (c) a lid member attached to said housing member and enclosing said chamber and having an opening and a protuberating valve seat communicating with the opening, where the protuberating valve seat is brought into contact with said closure member in the closed position; and (d) means for allowing the patient to suck and drink said liquid; (e) whereby when suction is applied to said means, said closure member is moved to the open position away from said protuberating valve seat of said lid member, thereby allowing said liquid to flow through said at least one aperture of said closure member to said means, and when suction is ceased, said closure member is moved back to the closed position and said liquid stops flowing through said at least one aperture.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A drinking aid device for elderly people, patients or the like used in conjunction with a remote liquid reservoir which has liquid therein, the drinking aid device comprising:
    a. a valve assembly including a lower housing member, a flexible closure member for blocking said liquid from flowing through the valve assembly in one direction, and an upper lid member;
    b. said lower housing member having a bottom with a central opening and a sidewall integrally formed with and upwardly extending from the bottom to an upper rim and forming an interior chamber which has a concave cavity and an annular groove located on the periphery of and surrounding the concave cavity;
    c. an outlet port attachment integrally attached to said bottom of said lower housing member, and protruding and communicating with said concave cavity of said interior chamber through said central opening of said lower housing member;
    d. said flexible closure member having a bottom surface, a top surface, an annular ring shaped flange extending down from the bottom surface and located on the periphery of said closure member, and a multiplicity of apertures extending through from the top surface to the bottom surface;
    e. said flexible closure member disposed within said interior chamber of said lower housing member such that said annular ring shaped flange of said closure member is tightly engaged with and secured within said annular groove of said lower housing member and movable by suction between an open position and a closed position for allowing said liquid to flow therethrough;
    f. said upper lid member having a bottom side, a top side, and a central opening extending through from the top side to the bottom side, the bottom side having a protuberating valve seat mounted within the central opening of said upper lid member;
    g. a coupling member integrally attached to said top side of said upper lid member and communicating with said central opening of said upper lid member;
    h. means for air-tightly attaching said upper lid member to said upper rim of said lower housing member such that said protuberating valve seat is brought into contact with said top surface of said closure member in said closed position;
    i. a drinking means having an outlet opening and an inlet opening for allowing the patient to suck and drink said liquid;
    j. first connection means having one end attached to said coupling member and the other end attached to said liquid reservoir for allowing said liquid to flow therethrough;
    k. second connection means having one end attached to said outlet port attachment of said lower housing member and the other end attached to said inlet opening of said drinking means for allowing said liquid to flow therethrough; and
    l. an operating piece member attached between said coupling member and said upper lid member and movable towards an axial direction to lift said closure member from said protuberating valve seat of said upper lid member into said open position to allow said liquid reservoir to be refilled through said outlet opening of said drinking means;

m. whereby when suction is applied to said outlet opening of said drinking means, said top surface of said closure member is moved to said open position away from said protuberating valve seat of said upper lid member, thereby allowing said liquid to flow through said multiplicity of apertures of said closure member for allowing the person to drink said liquid, and when suction is ceased, said top surface of said closure member is moved back to said closed position and said liquid stops flowing through said multiplicity of apertures of said closure member.

2. The drinking aid device as defined in claim 1 wherein said closure member is made of synthetic material.

3. The drinking aid device as defined in claim 1 wherein said drinking means further comprises a nipple member attached to a support frame member for allowing the patient to suck and drink said liquid.

4. The drinking aid device as defined in claim 3 wherein said nipple member further comprises an inner cone at said outlet opening for connecting a drinking pump or drinking syringe to empty said liquid from said valve assembly.

5. A drinking device for elderly people, patients or the like used in conjunction with a remote liquid reservoir which has liquid therein, the drinking device comprising:

a. a housing member having a bottom with an opening and a sidewall integrally formed with and upwardly extending from the bottom to an upper rim and forming an interior chamber, the interior chamber having a cavity and a groove located on the periphery of and surrounding the cavity;

b. an outlet port attachment attached to said bottom of said housing member, and protruding and communicating with said cavity of said interior chamber through said opening of said housing member;

c. a closure member having a bottom surface, a top surface, a flange extending down from the bottom surface and located on the periphery of the closure member, and at least one aperture extending through from the top surface to the bottom surface, the closure member disposed within said interior chamber of said housing member such that the flange is tightly engaged with and secured within said groove of said housing member and movable by suction between an open position and a closed position for allowing said liquid to flow therethrough;

d. a lid member air-tightly attached to said upper rim of said housing member and having a bottom side, a top side, and an opening extending through from the top side to the bottom side, and a coupling member integrally attached to the top side and communicating with the opening of the lid member, the bottom side having a protuberating valve seat located within the opening of the lid member, where the protuberating valve seat is brought into contact with said top surface of said closure member in said closed position;

e. drinking means for allowing the patient to suck and drink said liquid;

f. means for connecting said coupling member of said lid member to said liquid reservoir and said outlet port attachment of said housing to said drinking means; and g. an operating member attached between said coupling member and said lid member and movable towards an axial direction to lift said closure member from said protuberating valve seat of said lid member into said open position to allow said liquid reservoir to be refilled through said drinking means;

h. whereby when suction is applied to said drinking means, said top surface of said closure member is moved to said open position away from said protuberating valve seat of said lid member, thereby allowing said liquid to flow through said at least one aperture on said closure member for allowing the person to drink said liquid, and when suction is ceased, said top surface of said closure member is moved back to said closed position and said liquid stops flowing through said at least one aperture on said closure member.

6. The drinking device as defined in claim 5 wherein said closure member is made of synthetic material.

7. The drinking device as defined in claim 5 wherein said closure member is flexible.

8. The drinking device as defined in claim 5 wherein said drinking means further comprises a nipple member attached to a support frame member for allowing the patient to suck and drink said liquid.

9. The drinking device as defined in claim 8 wherein said nipple member further comprises an inner cone for connecting a drinking pump or drinking syringe to empty said liquid from said drinking device.

10. A drinking device for elderly people, patients or the like used in conjunction with a remote liquid reservoir which has liquid therein, the drinking device comprising:

a. a housing member having a chamber, an opening and an outlet port attached to the housing member and communicating with the chamber through the opening;

b. a closure member disposed and secured within said chamber of said housing member and movable by suction between an open position and a closed position for allowing said liquid to flow therethrough and having at least one aperture;

c. a lid member attached to said housing member and enclosing said chamber and having an opening and a protuberating valve seat communicating with the opening of the lid member, where the protuberating valve seat is brought into contact with said closure member in the closed position;

d. means for allowing the patient to suck and drink said liquid; and e. an operating member attached to said lid member and movable towards an axial direction to lift said closure member from said protuberating valve seat of said lid member into said open position to allow said liquid reservoir to be refilled through said means;

f. whereby when suction is applied to said means, said closure member is moved to the open position away from said protuberating valve seat of said lid member, thereby allowing said liquid to flow through said at least one aperture of said closure member to said means, and when suction is ceased, said closure member is moved back to the closed position and said liquid stops flowing through said at least one aperture.

11. The drinking device as defined in claim 10 wherein said closure member is made of synthetic material.

12. The drinking device as defined in claim 10 wherein said means for allowing the patient to suck and drink said liquid comprises a nipple member attached to a support frame member.

13. The drinking device as defined in claim 10 wherein said nipple member further comprises an inner cone for connecting a drinking pump or drinking syringe to empty said liquid from said drinking device.

14. The drinking device as defined in claim 10 further comprising first connection means for connecting said lid member to said liquid reservoir.

15. The drinking device as defined in claim 10 further comprising second connection means for connecting said outlet port of said housing member to said means.

* * * * *